(12) United States Patent
Schmid et al.

(10) Patent No.: US 11,135,920 B2
(45) Date of Patent: Oct. 5, 2021

(54) ADAPTIVE OPERATING DEVICE AND METHOD FOR ADAPTING AN OPERATING DEVICE

(71) Applicant: elobau GmbH & Co. KG, Leutkirch (DE)

(72) Inventors: Markus Schmid, Leinfelden-Echterdingen (DE); Andreas Kaufmann, Stuttgart (DE); Timo Schempp, Stuttgart (DE); Ingmar Stöhr, Aichstetten (DE)

(73) Assignee: elobau GmbH & Co. KG, Leutkirch (DE)

( * ) Notice: Subject to any disclaimer, the term of this patent is extended or adjusted under 35 U.S.C. 154(b) by 204 days.

(21) Appl. No.: 16/546,678

(22) Filed: Aug. 21, 2019

(65) Prior Publication Data

US 2020/0062120 A1 Feb. 27, 2020

(30) Foreign Application Priority Data

Aug. 24, 2018 (DE) ..................... 10 2018 120 732.8

(51) Int. Cl.
*B60K 37/06* (2006.01)
*A01B 71/02* (2006.01)
(Continued)

(52) U.S. Cl.
CPC .............. *B60K 37/06* (2013.01); *A01B 71/02* (2013.01); *A01B 71/063* (2013.01); *B60K 17/28* (2013.01);
(Continued)

(58) Field of Classification Search
CPC ...... B60K 37/06; B60K 17/28; A01B 71/063; A01B 71/02; A01B 76/00; A01B 79/005; B60Y 2300/1888; B60Y 2200/221
See application file for complete search history.

(56) References Cited

U.S. PATENT DOCUMENTS

| 4,554,978 A | * | 11/1985 | Schneider | ............... E02F 3/627 |
| | | | | 172/247 |
| 6,167,337 A | * | 12/2000 | Haack | ....................... E02F 9/26 |
| | | | | 222/63 |

(Continued)

FOREIGN PATENT DOCUMENTS

| DE | 202012006899 U1 | 10/2013 |
|---|---|---|
| EP | 1417875 A1 | 5/2004 |
| EP | 2875708 A1 | 5/2015 |

*Primary Examiner* — Mussa A Shaawat
(74) *Attorney, Agent, or Firm* — Dickinson Wright PLLC

(57) ABSTRACT

An adaptive operating device (1) for agricultural tractors includes two or more operating regions (2), each of which includes at least one manually operable operating element (3). The operating device (1) includes a detecting device (4) to detect the type of working apparatus (5) coupled to the tractor during use, a configuration device (6) cooperating with the detecting device (4) for configuring the functionality of an operating element (3) or operating region (2) for the type of coupled-on working apparatus (5), and at least one indicating element (7) of indicating a configuration of an operating region (2). Depending on the configuration, at least one operating element (3) can be changed with regard to its spatial position or can be configured with regard to direction or extent of movement.

13 Claims, 2 Drawing Sheets

(51) Int. Cl.
    *A01B 71/06* (2006.01)
    *B60K 17/28* (2006.01)
(52) U.S. Cl.
    CPC . *B60Y 2200/221* (2013.01); *B60Y 2300/1888* (2013.01)

(56) References Cited

U.S. PATENT DOCUMENTS

| | | | |
|---|---|---|---|
| 10,814,722 B2* | 10/2020 | Reinards | B60K 25/06 |
| 2005/0055147 A1* | 3/2005 | Hrazdera | A01B 79/005 |
| | | | 701/50 |
| 2009/0029826 A1* | 1/2009 | Eguchi | F16H 61/0246 |
| | | | 477/39 |
| 2012/0229394 A1 | 9/2012 | Ehr et al. | |
| 2014/0012732 A1* | 1/2014 | Lindores | G06Q 50/02 |
| | | | 705/37 |
| 2018/0057017 A1* | 3/2018 | Procuniar | G06Q 10/08 |
| 2018/0084709 A1* | 3/2018 | Wieckhorst | A01B 63/112 |
| 2019/0378354 A1* | 12/2019 | Nygren | A01B 63/10 |

* cited by examiner

ADAPTIVE OPERATING DEVICE AND METHOD FOR ADAPTING AN OPERATING DEVICE

TECHNICAL FIELD

The present invention relates to an adaptive operating device for agricultural tractors and a method for adapting an operating device.

BACKGROUND

Tractors are an essential part in any equipment inventory, in particular in agriculture, but also in construction and in forestry. Tractors are equipped with different drives, they are mobile and have established themselves as a universal tool, with which the most diverse working apparatus can be operated. The concept of a working apparatus, apart from appliances such as wood splitters, saws, winches, cutter bars, ploughs, cultivators and similar, is understood to also encompass working apparatuses with wheels such as loading trolleys, manure spreaders, slurry tanks, feed trolleys, beet lifters, balers etc.

As this short listing immediately shows, a tractor is required to also comprise—apart from the normal operating elements also called the HMI (human machine interface)—a plurality of operating elements for controlling its movements for operating the respective working apparatus.

These operating elements have, up to now, always been associated with different drives and lifts, such as PTO shafts (power take-off shafts) at the front and/or rear, hydraulic connections, compressed air connections, insofar as to be operated, rear linkage and/or front linkage (three-point linkage), and are normally combined in an operating arm rest next to the driver's seat. This operating region, apart from rotary controls, push buttons, switches, normally also comprises a number of joysticks as operating elements, also a monitor as indicating element, wherein the operating elements are backlit and thus also designed as indicating elements. These known indicating elements cannot be changed; they control certain properties of the tractor such as the up/down movement of the rear linkage. The standardized operating devices of the state of the art are combined to form generic function groups, in particular function groups for operating the three-point hitch, the PTO-shaft and selective control valves for operating hydraulic cylinders and motors. An operator is thus presented with a plurality of operating elements, often as many as fifty, which are generically labelled, e.g., with "hydraulic circuit 2". If an operator has failed to remember how he has connected the working apparatus to the tractor, or if he accepts the tractor from another user with already connected working apparatus, he has to work through a plurality of combinations before he succeeds in determining the operating elements relevant for the working apparatus and discovering their actuating direction, and storing all this permanently in his memory. This inevitably leads to operating errors and a lot of wasted time, since an operating element labelled "hydraulic circuit 2" does not indicate which function of the working apparatus it controls and how it does so. It is also quite normal for an operating element to be moved to the right/left, although controlling an up/down function. A user is therefore faced with the difficulty of finding out that his expectations are not compatible with the operation.

The advantage for an operator of having all operating elements of one function group grouped together, also brings with it the disadvantage, apart from the other disadvantages mentioned, that it may be necessary for him to frequently change the position of his operating hand or operating arm when moving from one function group to another function group.

SUMMARY

It is therefore the objective of the present invention, to avoid this disadvantage and to propose a respective device and method.

The objective is met by an adaptive operating device for agricultural tractors, comprising two or more operating regions, wherein each operating region comprises at least one manually operable operating element, wherein the operating device comprises a detecting device, which detects the type of working apparatus coupled to the tractor during use, wherein the operating equipment further comprises a configuration device cooperating with the detecting device, the configuration device configuring the functionality of an operating element and/or an operating region in dependence of the type of coupled-on working apparatus, wherein the operating device further comprises at least one indicating element, which during use indicates a configuration of an operating region, wherein depending on the configuration at least one operating element can be changed with respect to its spatial position and/or can be configured with respect to direction and/or extent of its movement.

The invention makes it possible to make use to great advantage of one and the same operating element for performing very different functions, the type of which, during use, is determined in dependence of the respectively coupled-on working apparatus. Thus, according to the invention, it is possible for a user, using one and the same operating element, to lift and/or lower a front linkage on one working apparatus, to cause the PTO-shaft to rotate at the front or the rear on another working apparatus or to stop the same, or to open/close a hydraulic valve on a third working apparatus. To this end, the detecting device according to the invention is provided, which in the simplest case is a data input unit, wherein the user himself informs the detecting unit via e.g. keyboard, voice command, touch screen, which working apparatus is attached. According to the invention, the detecting device may also be an interface, via which the device receives the corresponding information, for example from an internal communication bus of the tractor and thus from another control device.

The detecting device is then forwarding this information to a configuration unit, in which the respective configuration of the one or more operating elements for each working apparatus is stored and which then executes a corresponding configuration. The indicating device present according to the invention, which again may be a monitor, a lighting unit or something else, then displays the chosen configuration to the user. Using this invention it is now possible to configure one, more, or all operating elements of an operating unit so as to match a working apparatus and to communicate this configuration to the user.

The possible configurations of the operating elements, on the basis of which they are restricted or generally altered with respect to their spatial position or their extent and direction of movement, basically apply to all operating elements, but are particularly relevant for the already mentioned joysticks. Here one of the horizontal movement axes for example could be locked or released, a pressure function could be blocked or released in z-direction or the extent of a movement could be changed, for example restricted, along one or both horizontal movement axes. Especially advantageously such a basic changeability of the operating element leads to the expectations of a user being met, in other words a rotation to the right/left of the operating element is capable of triggering and controlling a rotation to the right/left of the working apparatus. According to the invention the operating element is thus configurable in such a way that it is compatible with a user's expectations and with the movement of the operating apparatus. According to the invention, this would also include a variable arrangement of the operating element in the operating region, i.e. its basic changeability in its spatial position within the operating region.

Especially advantageously it is thus possible for the user to control the most different working apparatuses from one and the same operating unit without changing his arm or wrist joint position.

In further developments of the invention, a first operating region is configured in such a way that at least one of its operating elements controls the most frequently occurring operating movements typical for the working apparatus, and that a second and each further operating region is configured in such a way that its one or more respective operating elements control the second-most frequently, third-most frequently, n-most frequently occurring operating movements typical for the working apparatus. The invention thus most advantageously makes it possible to concentrate the most frequent operating functions of a working apparatus in an operating region which in an inactive position is closest to an operator's arm, or is arranged in the inactive position. With a plough as working apparatus this would for example be an up and down movement of the rear linkage. A second most frequent operating function would for example be the rotary/swivel movement of a sweeping plough, so that thereafter its other plough shares are operative. These and possibly other second-most frequent functions are, according to the invention, assigned to the first adjacent operating region and its operating elements, so that even a small movement of a user is sufficient to perform these secondary functions. Possibly existing third-most frequent functions would then, according to the invention, be assigned to a third operating region and its operating elements, so that a user must perform a larger movement in order to perform these functions. However, since such functions are to be performed more rarely during a working step, this leads to an altogether high degree of ergonomics for a user. This is always particularly important then, when the user has to handle the working apparatus over a long period, in particular over several hours. Cases of this kind occur for example very frequently with agricultural contractors, the tractor drivers of which are busy the whole day with accepting in their attached loading trolleys harvested sweet corn, cereals, rape, grass etc. from combine harvesters or field choppers and with the removal thereof.

If the operating regions are implemented as adjacent regions, in particular circular-segment-type regions, in particular such that they are arranged so as to be accessible and operable during use for a user by rotating the elbow joint and/or wrist joint, a particularly ergonomic operation is achieved which is to great advantage. The circular-segment-type arrangement according to the invention not only means an arrangement in a strongly mathematical sense, but also includes arrangements such as oval, elliptical or generally irregular arrangements of the operating regions, so long as these are accessible for the user's fingers via a predominantly rotational/swiveling movement of a user arm.

In further developments of the invention, the first operating region, in particular its operating element is accessible for operation from a not-rotated position of an operator arm and/or that second, third or further operating regions are designed so as to be accessible for operation with a respectively stronger rotation.

If each operating region has an indicating element, the user is simply and clearly signaled, which function is currently assigned to the one or more operating elements. Instead of a large indicating element, as normally represented by an existing large screen, the invention also provides for smaller, in particular LED-based screens insensitive to touch. This has the advantage that the operating element, instead of being labelled "hydraulic circuit 2" is now labelled, depending on the working apparatus, with "lift/lower ploughshare" or bale feed on/off", or that it is indicated as appropriate.

If the device comprises at least one joystick as the operating element of an operating region or is provided independently thereof, a particularly large plurality of functions can be integrated in this operating element, because the same is controlled via a number of axes.

In further developments of the invention, depending on the configuration, at least one operating element can be switched on or off with regard to its function. According to the invention the said configuration also includes countersinking the operating element or making it inaccessible in other ways, and thus switching off its functionality. This reduces the number of operating elements visible to a user to the operating elements currently necessary for the work in hand.

The operating elements configurable according to the invention comprise a function selected from the group formed by the basic functions: forward/back, right/left, up/down, on/off, open/closed, more/less, clockwise or anti-clockwise rotate/swivel. This listing is to be understood as not final, for example a special working apparatus could also comprise a special basic function not mentioned.

To great advantage the invention no longer associates operating elements with fixedly determined tractor functions, but associates them with a primary, secondary or tertiary function of a working apparatus, independently of through which tractor function this is achieved. According to the invention one and the same operating element can therefore, by means of reconfiguration, control completely different tractor functions one after the other in terms of time and in dependence of the working apparatus. According to the invention one and the same operating element thus alternates in controlling the rear linkage, the PTO shaft, a hydraulic valve or in controlling nothing.

To this end the device comprises a database, which stores the corresponding data of individual working apparatuses and which the device accesses for assignment. The database as well as respective computers and data acquisition units are also part of the device according to the invention. This database also includes one or more data acquisition modules, in particular in the form of an input unit which detects the working apparatus either automatically or into which data is input manually, for example in the form of selecting the working apparatus from a table or summary. As already described the necessary information can also be communicated via a bus system of the working apparatus itself or the tractor, so that the detecting device is a data interface which also simultaneously functions as a data acquisition module. In this case the input unit and possibly other control units would have to be assigned to the tractor or the working apparatus rather than the operation unit.

The objective regarding the method is met by a method for adapting an operating device, comprising two or more adjacently arranged operating regions, each of which comprises at least one manually operable operating element, in particular according to one of the preceding claims, comprising the steps of: a) identifying a coupled-on working apparatus by means of a detecting device, b) selecting the operating functions required for the coupled-on working apparatus from a group of basic functions stored for each working apparatus, c) hierarchizing the selected operating functions according to frequency of use and d) assigning the most frequently used operating function to the operating element of the first operating region and the further operating functions in decreasing order of frequency of use to the operating regions accessible for operation upon a stronger rotation, respectively.

These steps do not necessarily have to be performed in succession and immediately following one another in this order, rather, according to the invention some steps may be performed in parallel or in inverted order or followed by other method steps not yet mentioned. Preferably however identification is always the first step in the series of method steps. According to the invention identification may be performed manually by an input of some kind or by selection from a displayed list of working apparatuses or automatically by e.g. a RFID tag or other communication options between working apparatus and operating device.

According to a further step of the method according to the invention a number of basic functions required for the detected working apparatus is selected, for example lifting-lowering-rotating in case of a plough, and placed in hierarchical order corresponding to how frequently used. To this end the method according to the invention accesses a previously created database, which for all types of working apparatus contains the respective functions and their frequency of use when using the working apparatus. Prior to using the method according to the invention therefore it is necessary to perform the steps of ascertaining these functions and their frequency of use, wherein the latter is distinctly more elaborate. This data is stored in a database accessed by the method.

In further developments of the invention, the operating elements, in dependence of the assigned operating function, are changed with regard to their degrees of freedom, the extent of their deflection, the force required for a deflection, their readiness for operation, their position in the respective operating region. The advantages have already been described because in this way a single operating element is adapted to many functions and working apparatuses, and only those movements of the operating element are available to the user which he needs for the current working apparatus. Thus operating errors are excluded or minimized.

Finally a further development provides for the function assigned to an operating element to be displayed on an indicating device in or after step d).

BRIEF DESCRIPTION OF THE DRAWINGS

The invention will now be described by way of an exemplary embodiment with reference to the drawing, wherein further advantageous details can be recognized in the figures of the drawing.

Functionally identical parts are provided with identical reference symbols.

In the figures of the drawing,

Figure 1:
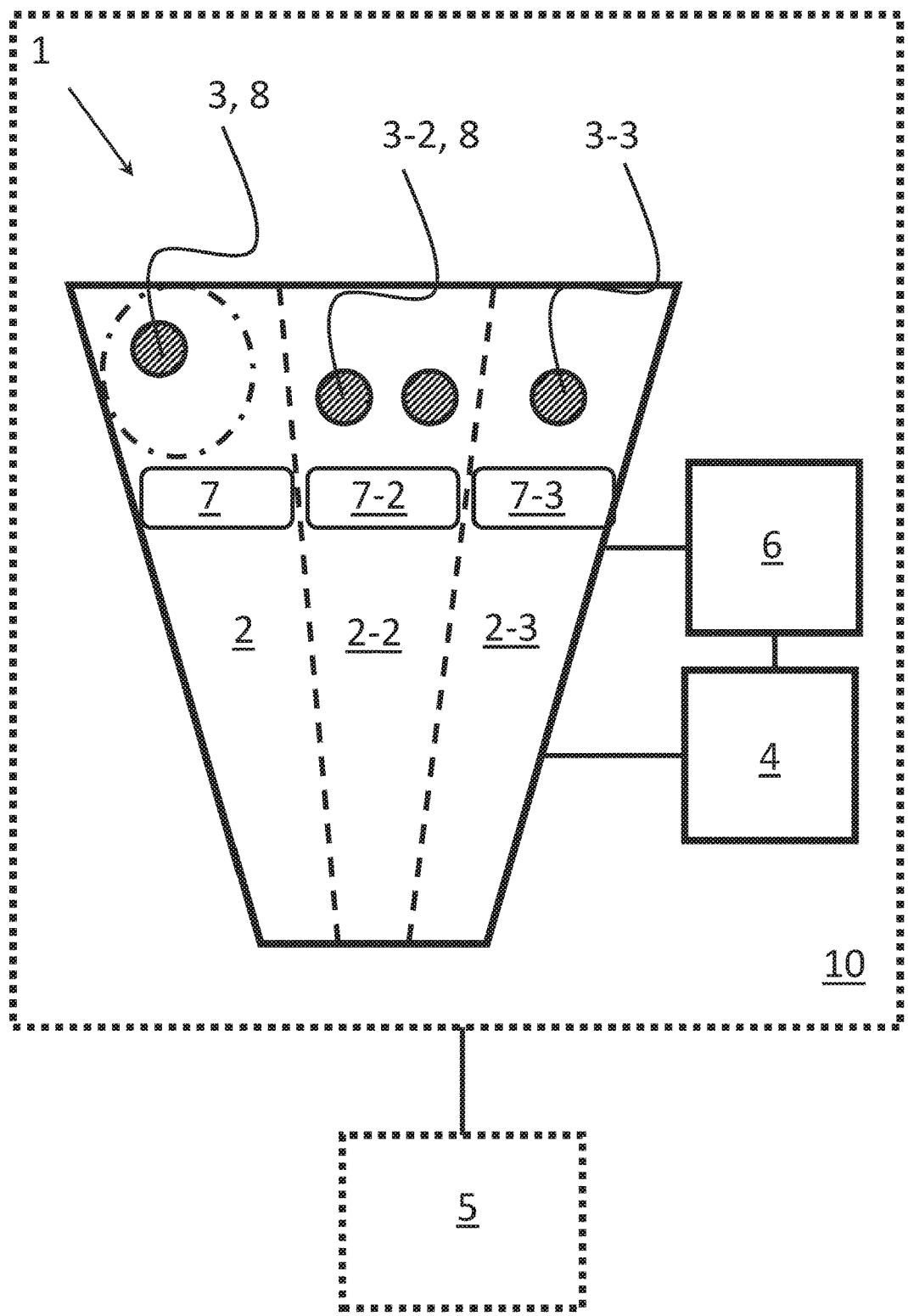

FIG. 1: shows a schematic illustration of an adaptive operating system and

Figure 2:
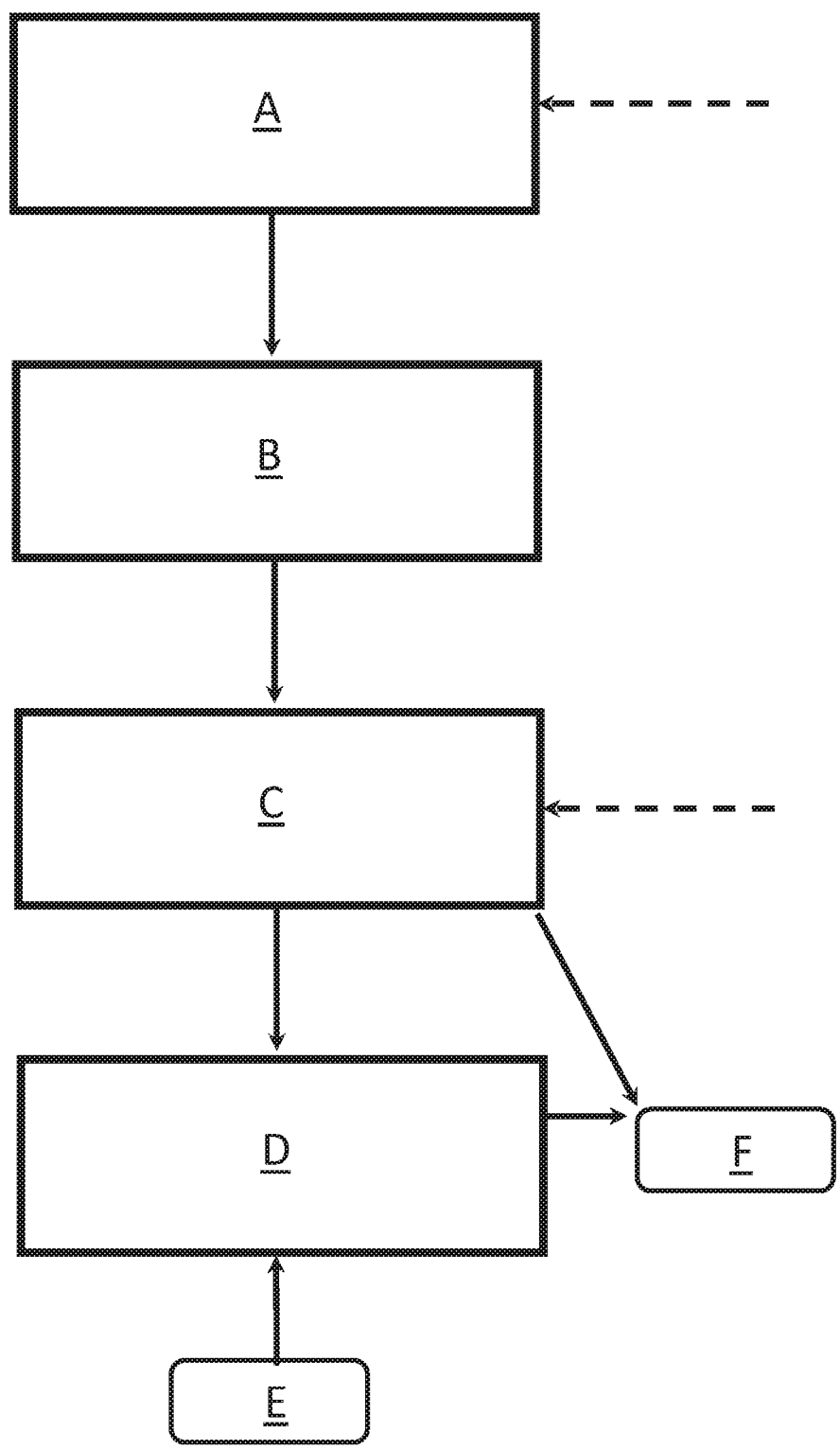

FIG. 2: shows a schematic flow diagram of a method according to the invention.

DETAILED DESCRIPTION OF THE DRAWINGS

FIG. 1 shows an embodiment of an inventive adaptive operating device 1, arranged in a schematically illustrated tractor 10, which in turn is operatively connected to a schematically drawn working apparatus 5. The adaptive operating device 1 comprises a number of operating regions 2 each of which comprises one or more operating elements 3 and which are arranged here directly adjacent to one another in the manner of circular segments/a trapezoidal shape. According to the invention, the whole operating device 1 may comprise a one-part uniform housing, so that the separation into different operating regions tends to be one which reflects more a rotary angle of a user arm rather than a concrete actual layout. Any design that makes such a rotation possible is covered by the invention, i.e. in particular each design comprising a narrower region and a wider region further remote from a user.

An operating region 2 comprises at least one operating element 3, preferably a number of operating elements 3 as depicted, which may also be designed, at least partially, as a joystick 8. According to the invention these operating elements 3 are changeable with respect to their operating movement, namely depending on a working apparatus currently coupled to the tractor in which the operating device 1 is mounted. This means that the one or more operating elements 3 vary with respect to their operating function, for example with respect to their degrees of freedom of movement, the extent of their deflection, the force required for a deflection, their operational readiness, their position in the respective operating region. Especially advantageously joysticks as operating elements 3 can be adapted in this way, but also thumbwheels or rotatable controls or switches. With rotatable controls in particular a direction of rotation for example can be blocked or restricted, insofar as these controls are equipped accordingly. Switches can be retracted and thus rendered no longer operable.

A detecting device 4 and a configuration device 6 are also schematically shown, which are designed to be operatively connected to, and comprise a data link to, the adaptive operating device. The diagram in particular does not show a database, a computer, an input unit, which would be the, or would be part of, the detecting device 4.

However, the user has first to familiarize himself with this inventive new concept. Up to now, a defined operating element has been assigned strictly to a defined tractor function. The invention does completely away with this strict relationship, assigning completely different tractor functions to one operating element, in dependence of and according to, the working apparatus coupled to the tractor. Instead, according to the invention, prioritizing is taking place according to the function's frequency of use, so that the most frequent applications are assigned to those operating elements which are spatially closest to an inactive position of the operator arm, thereby enabling a very relaxed operation, without requiring a large deflection in the arm joint or wrist joint and if possible also without any great tensioning of muscles.

Also according to the invention, it is not only tractor functions of operating the working apparatus, which are assigned to the adaptive operating element, but also those of the actual driving operation, wherein no strict separation is possible here. For example the functions of idling and/or driving speed, which may differ depending on the working apparatus and/or working situation, may be assigned to an operating element. This also possibly applies to steering functions or selection of the driving direction.

According to the invention a single operating element is thus adaptable to many functions and thus to working apparatuses, wherein in particular only those movements of the operating element are available to the user, which he needs for the actual working apparatus. This excludes or minimizes operating errors.

With this embodiment, a respective indicating element 7 is provided for each operating region 2. This indicates to a user the working apparatus for example and the respective function assigned to the operating element, for example in the form of a pictogram.

In FIG. 1 the hierarchically descending assignments are joined by means of hyphens, for example the operating regions marked **2, 2-2, 2-3, . . . 2-*n*, corresponding operating elements are marked 3, 3-2, 3-3, . . . 3-*n*.**

It is also revealed in FIG. 1 that these operating regions **2, 2-2, . . . 2-*n*** may be haptically delimited from each other, which is indicated by a broken line drawn in between. This line symbolizes for example a slight arching of the surface, a rounded-off web or it stands for different surface structures in adjacent operating regions. A varying color scheme for the regions is also covered by the invention. Elevations similar to a cupped hand are also possible, which is indicated by a chain-dotted line.

FIG. 2 shows a schematic flow diagram of a method according to the invention.

In a first step A, the coupled-on working apparatus is identified via a detecting device. In the simplest case this detecting device may be, as described, the user himself, who inputs the type and model, if required, of the working apparatus, so that it is recognized. To this end, a database is provided which the method utilizes. This database contains details as to the kind, type and functions of the working apparatus as well as their prioritization regarding frequency of use during operation. In a step B, the basic functions required for the coupled-on working apparatus are then selected from a group of basic functions comprised by this working apparatus. In a further step C, the selected operating functions are then hierarchized according to their frequency of use, and in step D, the operating function most frequently used is assigned to the one or more operating elements of the first operating region, and the further operating functions are assigned in descending order with respect to frequency of use to the respective operating regions accessible for operation upon stronger rotation. Step C preferably takes place as early as during creation of a database, so that retrieval of the hierarchical order is all that is necessary in this case. According to the invention, manual intervention by a user may be provided for so that the user can change this hierarchical order according to his wishes. This intervention is indicated by a broken-line arrow.

These steps do not necessarily have to be performed directly one after the other and a step of manual assignment to a certain operating element may also be provided for. This will always be relevant then, when a user habitually or due to physical circumstances wants to assign a certain function to a certain operating element, for example if he is able to access this in a particularly easy manner. In this way the lengths of hands and fingers or also of missing parts of a finger can be taken account of. This is covered by an optional step E which may be carried out in addition to step D.

With the method according to the invention, the operating elements are changed in dependence of the assigned operating function regarding their degrees of freedom, the extent of their deflection, the force required for a deflection, their operational readiness, and their position in the respective operating region.

Providing an indication during or after step D of a function assigned to an operating element is also part of an embodiment of the method and is labeled with E.

While the above description constitutes the preferred embodiments of the present invention, it will be appreciated that the invention is susceptible to modification, variation and change without departing from the proper scope and fair meaning of the accompanying claims.

What is claimed is:

1. An adaptive operating device (1) for an agricultural tractor, comprising:
   at least two operating regions (2), wherein each operating region (2) comprises at least one manually operable operating element (3),
   a detecting device (4) which is configured to distinguish between at least two different types of working apparatus (5) to be coupled to the agricultural tractor, the detecting device detecting one type of working apparatus (5) coupled to the tractor during use out of the at least two different types of working apparatus,
   a configuration device (6) cooperating with the detecting device (4), which configures a functionality of at least one of an operating element (3) and an operating region (2) in dependence of the one type of attached working apparatus (5),
   an indicating element (7), which, during use, indicates a configuration of at least one of the at least two operating regions (2), wherein, depending on the configuration, at least one of the at least one operating element (3) is configured to allow for changing a spatial position of the operating element or to set a movement direction or a movement range of the operating element.

2. The adaptive operating device (1) according to claim 1, characterized in that a first operating region (2-1) of the at least two operating regions is configured such that the at least one operating element (3-1) of the first operating region controls operating movements that occur most frequently in a typical operation of the working apparatus and in that a second of the at least two operating regions and any further operating region (**2-2, 2-3, . . . , 2-*n*) is configured such that a respective one or more associated operating elements (3-2, 3-3, . . . 3-*n***) control second-most frequent and less frequent operating movements typical for the working apparatus.

3. The adaptive operating device (1) according to claim 1, wherein the at least two operating regions (3) are adjacent to one another.

4. The adaptive operating device (1) according to claim 1, wherein the at least two operating regions (3) are circular-segment-type regions, arranged so as to be accessible for operation by an operator during use by rotation of the operator's elbow joint or wrist joint.

5. The adaptive operating device (1) according to claim 4, wherein a first operating region (2-1) of the at least two operating regions and the at least one operating element (3-1) associated therewith are accessible for operation from a non-rotated position of an operator arm and wherein successive further operating regions (**2-2, 2-3, 2-*n***) are accessible for operation by increasing rotation of the operator's elbow joint or wrist joint.

6. The adaptive operating device (1) according to claim 1, wherein each or the at least two operating regions (3) comprises a respective indicating element (7).

7. The adaptive operating device (1) according to claim 1, further comprising at least one joystick (8).

8. The adaptive operating device (1) according to claim 1, wherein, depending on the configuration, at least one operating element (3) of the at least two operating regions is configured to be switched on or off with respect to its function.

9. The adaptive operating device (1) according to claim 1, wherein at least one of the operating elements is configurable and has a configuration to perform at least one function selected from the group of functions consisting of: forward/back, right/left, up/down, on/off, open/closed, more/less, clockwise rotate/swivel, and anti-clockwise rotate/swivel.

10. A method for adapting an operating system (1) configured to distinguish between at least two different types of working apparatus (5) to be coupled to the agricultural tractor, comprising two or more adjacently arranged operating regions (2), each of which comprises at least one manually operable operating element (3), comprising the steps of:
   a. Identifying, via a detecting device (4), one of the at least two different types of working apparatus (5) represented by a coupled-on working apparatus (5),
   b. Selecting operating functions required for the coupled-on working apparatus (5) from a group of basic functions based on the identified one of the at least two different types of working apparatus (5),
   c. Hierarchizing the selected operating functions according to frequency of use and
   d. Assigning the most frequently used operating function to the operating element (3-1) of a first operating region (2-1) and the less frequently used further operating functions in descending order to respective operating regions (2-2, 2-n) accessible for operation upon rotation of the at least two operating regions.

11. The method according to claim 1, in which the at least one operating element (3) of a respective operating region has, in dependence on the assigned operating function, assigned degrees of freedom, an assigned extent of deflection, an assigned force required for a deflection, an assigned operational readiness, or an assigned position in the respective operating region.

12. The method according to claim 10, further comprising the step of displaying the operating function assigned to the at least one operating element (3) on a display, during or after assigning the operating functions.

13. The method according to claim 10, wherein the most frequently used operating function and the less frequently used further operating functions differ among the at least two different types of working apparatus (5).

* * * * *